United States Patent [19]

Denrée

[11] Patent Number: 4,567,968

[45] Date of Patent: Feb. 4, 1986

[54] LOCKING ELEMENT FOR DISC BRAKE WITH SLIDING CALIPER AND DISC BRAKE COMPRISING SUCH A LOCKING ELEMENT

[75] Inventor: Michel Denrée, Aulnay sous Bois, France

[73] Assignee: Societe Anonyme D.B.A., Paris, France

[21] Appl. No.: 623,669

[22] Filed: Jan. 16, 1984

Related U.S. Application Data

[63] Continuation of Ser. No. 312,592, Oct. 19, 1981, abandoned.

[30] Foreign Application Priority Data

Dec. 16, 1980 [FR] France .............................. 80 26657

[51] Int. Cl.[4] .............................................. F16D 65/09
[52] U.S. Cl. .................................... 188/73.34; 24/549;
188/73.45; 267/155; 403/155; 403/379;
403/397
[58] Field of Search ............... 188/73.33, 73.34, 73.43,
188/73.44, 73.45; 403/154, 155, 378, 379, 397,
324; 24/548, 549; 267/155

[56] References Cited

U.S. PATENT DOCUMENTS

| 2,319,462 | 5/1943 | Kruse | 24/549 X |
|---|---|---|---|
| 3,402,789 | 9/1968 | Biabaud | 188/73.38 |
| 3,606,525 | 9/1971 | Landree | 267/155 X |
| 3,805,925 | 4/1974 | Schoenhenz | 188/73.45 |
| 4,027,899 | 6/1977 | Hawes et al. | 267/155 X |
| 4,243,342 | 1/1981 | Marto | 403/324 |
| 4,372,428 | 2/1983 | Delaunay et al. | 188/73.45 X |

FOREIGN PATENT DOCUMENTS

| 1166017 | 3/1964 | Fed. Rep. of Germany . | |
| 2310292 | 9/1973 | Fed. Rep. of Germany ... | 188/73.43 |
| 2142248 | 1/1973 | France . | |
| 2339780 | 8/1977 | France . | |
| 2422863 | 12/1979 | France .............................. | 188/73.44 |
| 1283680 | 8/1972 | United Kingdom . | |

*Primary Examiner*—George E. A. Halvosa
*Attorney, Agent, or Firm*—Larry J. Palguta; Ken C. Decker

[57] ABSTRACT

The invention relates to a locking element for a disc brake with a sliding caliper and a disc brake comprising such a locking element. The brake includes a caliper mounted in sliding relationship on a fixed support by two axial posts cooperating with bores formed in the caliper. The bores are provided with indentations allowing the introduction of the posts transversely and without dismounting the latter. One of the posts is provided with a locking bush maintained locked to the caliper by a locking element of which one portion passes through an orifice formed in the caliper and locking the bush and of which another portion in the shape of a U fixes the locking element relative to the caliper.

1 Claim, 6 Drawing Figures

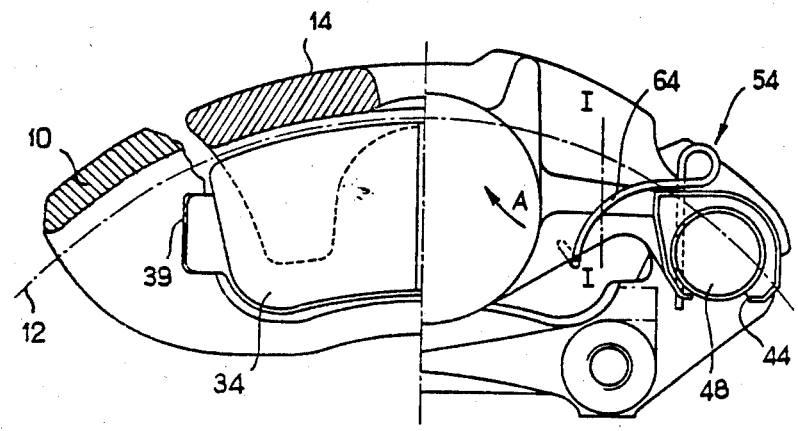
FIG_1
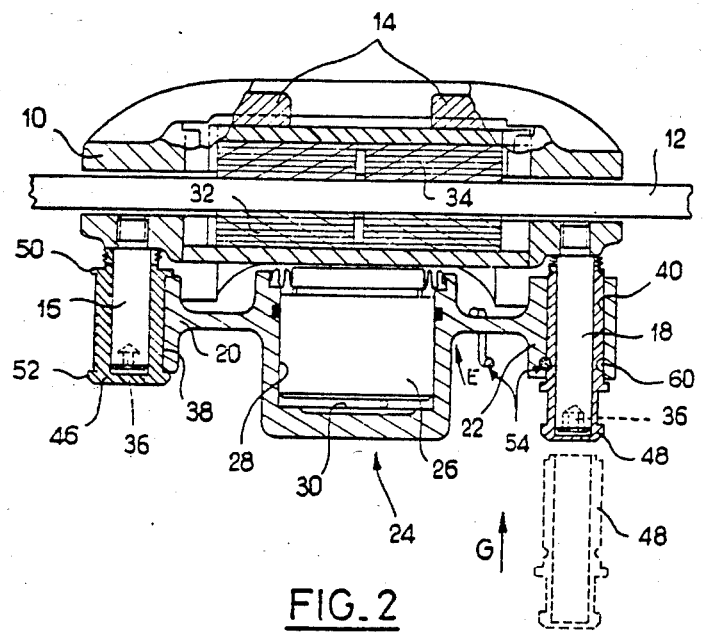
FIG_2

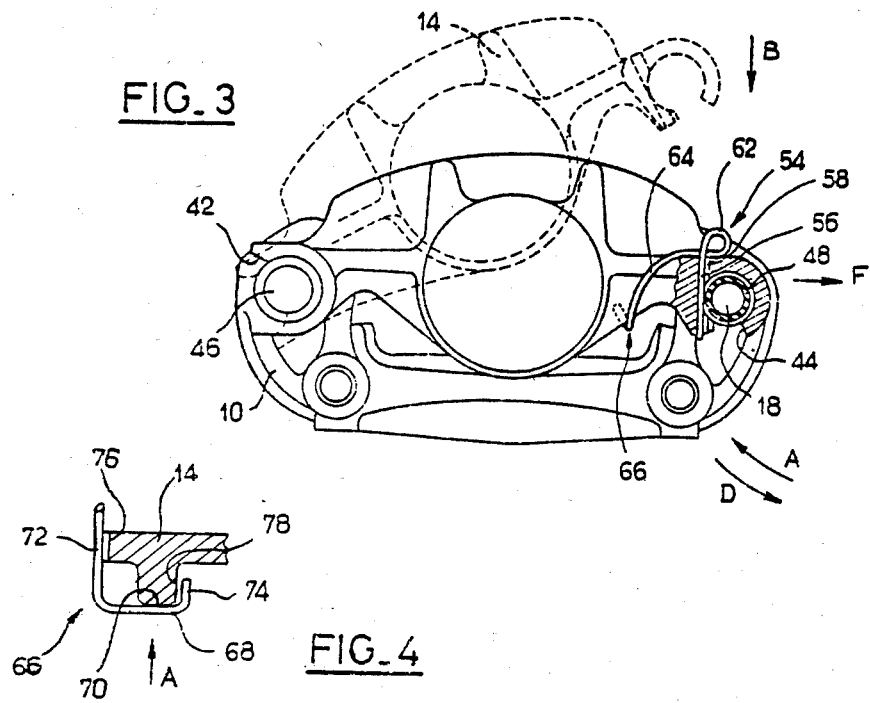
FIG_3
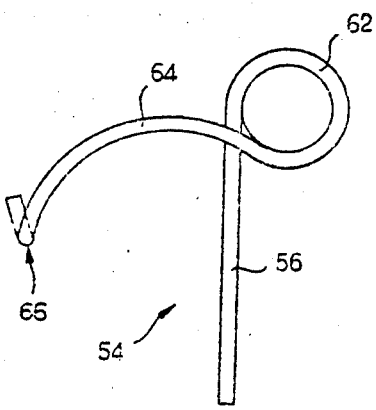
FIG_5
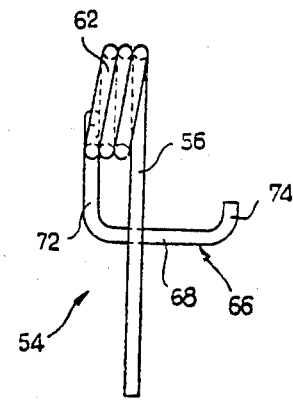
FIG_6

LOCKING ELEMENT FOR DISC BRAKE WITH SLIDING CALIPER AND DISC BRAKE COMPRISING SUCH A LOCKING ELEMENT

This is a continuation of application Ser. No. 312,592, filed Oct. 19, 1981, now abandoned.

The invention relates to a locking element for the sliding caliper of a disc brake particularly for an automobile vehicle and a disc brake with sliding caliper comprising such a locking element.

The invention concerns in particular a locking element for a caliper of a disc brake of which the caliper is mounted in sliding relationship by means of at least one axial post, on a fixed support in which are received in anchorage and in sliding motion two friction elements capable of coming into frictional engagement with the opposed faces of a rotating disc during setting in operation of a brake motor acting directly on one of the friction elements and acting on the other friction element by reaction across the sliding caliper.

A disc brake of the type defined above is known from French Pat. No. 71-22194 published under the No. 2 142 248, in which two axial posts fixed on the fixed support pass through bores provided in opposition in the caliper, protective sliding bushes being mounted in the bores to cooperate with the posts. The bushes are fixed rigidly to the caliper by means of pins supported by one of their ends on the caliper and the other end passing through grooves formed on the one hand in the caliper and on the other hand in the bush. In this type of brake, interventions such as changing of a piston, a piston packing and in particular changing of the friction elements lead to rocking of the caliper after removing a pin and one of the bushes. On the occasion of these interventions, the locking pin of the bush may be damaged or deformed; the pin could then come loose from the caliper. The bush which is no longer fixed axially is capable of sliding outside the corresponding bore of the caliper; the latter, being no longer held, is capable of coming adrift from the fixed support and inducing damage to the vehicle, causing it to lose all or part of its braking.

The invention relates to a locking element for a caliper of a disc brake of the type described above in which such disadvantages are avoided.

With this object, the invention proposes a locking element for a disc brake caliper mounted slidingly on a fixed support, comprising two friction elements received in anchorage and in sliding motion in said fixed support and capable of coming into frictional engagement with the opposed faces of a rotating disc during setting in operation of a brake motor acting directly on one of the friction elements and acting on the other friction element by reaction across the sliding caliper, at least one axial sliding post rigidly fixed to the fixed support and receiving in sliding motion a corresponding bore formed in the caliper, said post cooperating with the corresponding bore by means of a bush axially fixed in said bore by means of said locking element passing through grooves or the like provided in said bush and in said bore, characterized in that said locking element is fixed positively relative to said caliper by means of a U-shaped portion of said locking element cooperating with a portion of the caliper on which it is maintained in contact.

It is thus evident that, on account of the invention, locking of the bush by means of the locking element is rendered reliable on account of positive fixing of this locking element relative to the caliper, and as will appear in the light of the description which is to follow, the risks of deformation of the locking element are considerably reduced.

A preferred embodiment of the invention will now be described by way of example without limitations, referring to the attached figures in which:

FIG. 1 is an end view of a disc brake of which one half is shown in cross-section, and which comprises the locking element which is the subject of the invention;

FIG. 2 is a sectional view from above of the brake shown in FIG. 1 showing the stages of assembly of the brake;

FIG. 3 is an end view of the disc brake of FIG. 1 showing the stages of assembly of the brake;

FIG. 4 is a section along line I—I of FIG. 1 showing attachment of the locking element;

FIG. 5 is an enlarged end view of the locking element which is the subject of the invention;

FIG. 6 is an enlarged side view of the locking element of FIG. 5.

The disc brake shown in FIGS. 1 to 3 comprises a supporting member 10 provided for association with a fixed part of the vehicle (not shown) and formed in the embodiment shown by a plate disposed in the vicinity of a disc 12 provided for association in rotation with a wheel of the vehicle (not shown). The fixed support 10 receives in sliding motion, by means of two circumferentially spaced axial posts 16 and 18, a movable caliper 14 astride the disc. The axes of the posts 16 and 18 are approximately parallel to the axis of rotation of the disc 12 and the posts 16 and 18 are disposed between the fixed support 10 and arms 20 and 22 defined in the caliper 14. The caliper 14 comprises actuating means 24 formed by a hydraulic brake motor (see FIG. 2) including a piston 26 mounted slidingly in a bore 28 defined in the caliper 14 and responsive to the pressure prevailing in a control chamber 30 capable of being connected to a pressure source such as for example the master cylinder of the vehicle (not shown). The piston 26 is disposed so as to urge directly a first friction element 32 against a first face of the disc 12 when the fluid under pressure is admitted to the chamber 30. The caliper 14 is capable of moving by reaction across the caliper 14, causing sliding of the latter on the posts 16 and 18 in order to urge a second friction element 34 against the other face of the disc 12. As FIG. 1 shows in particular, the friction element 34 is supported in sliding motion and in anchorage by circumferentially spaced edges 39 of an opening made in the fixed support 10. In an identical manner, the friction element 32 is likewise received in anchorage and in sliding motion on the fixed support 10.

As FIG. 2 shows more particularly, the two posts 16 and 18 are associated with the fixed support 10 by a threaded connection. More precisely, the posts 16 and 18 which permit sliding movement of the caliper 14 are mounted screwed on said fixed support. In the example shown, each of the posts is provided with a head in which is formed a hollow hexagonal screw head 36 allowing the posts to be fixed with the aid of a corresponding spanner (not shown).

The arms 20 and 22 of the caliper 14 are provided with bores 38 and 40 in which are inserted the posts 16 and 18 respectively. The bores 38 and 40 are each provided with an indentation, 42 and 44 respectively (see FIG. 3), in such a way that the two bores 38 and 40 exhibit in cross-section the shape of a C.

Considering FIG. 3, the indentation 42 is directed approximately parallel to the planes passing through the axes of the posts 16 and 18 and opens towards the exterior of the brake. The indentation 44 is directed approximately perpendicularly to the plane defined above and opens vertically downwards.

Referring to FIGS. 1, 2, 3, it can be seen that the posts 16 and 18 are each provided with a cylindrical bush respectively 46 and 48, closed at one end and mounted over the corresponding post. The bush 46 cooperates with the post 16 and is rendered integral with the arm 20 of the caliper 14 by means of two shoulders 50 and 52 which fix the bush 46 relative to the arm 20.

According to the invention, the bush 48 mounted on the post 18 is rendered integral with the arm 22 of the caliper 14 by means of a locking spring 54 forming a locking element of which a rectilinear portion 56 is mounted in an opening 58 formed in the arm 22 of the caliper 14. The rectilinear portion 56 cooperates by its central portion with a groove 60 formed in the outer cylindrical surface of the bush 48. Apart from the locking rectilinear portion, the locking spring 54 comprises a portion 62 formed from a helical winding connected on the one hand to the rectilinear portion 56 and on the other hand by means of a curved portion 64 to a U-shaped portion 66 which fixes the spring 54 relative to the caliper 14. As seen more particularly in FIG. 4, the U-shaped portion 66 comprises a central portion 68 maintained in contact with a surface 70 of the caliper 14 by means of the helical winding 62, which urges this portion 68 in the direction of the arrow A. Apart from the central portion 68, the U-shaped portion 66 comprises two branches 72 and 74 capable of coming to bear respectively on surfaces 76 and 78 formed on the caliper 14. These two branches 72 and 74 fix the spring 54 axially relative to the caliper.

FIGS. 5 and 6 show the spring 54 before its assembly on the brake.

The operation of assembly of the caliper 14 on the fixed support 10 is effected in the following manner (see FIGS. 2 and 3):

The two posts 16 and 18 being already fixed on the fixed support 10, the bush 46 is mounted over the post 16. The caliper 14 is then presented to engage the indentation 42 on the bush 46, taking care to effect correct positioning of the arm 20 relative to the shoulders 50 and 52 of the bush 46. The caliper 14 is rocked according to arrow on the support 10, making it pivot about the post 16, which has the effect of engaging the post 18 in the vertical indentation 44 of the bore 40 formed on the arm 22. While positioning the post 78 and the bore 40 approximately coaxially, and while maintaining this position, the sliding and locking bush 48 is put on axially (following arrow G of FIG. 2). Assembly of the locking spring 54 is then proceeded with. For this, the rectilinear portion 56 is introduced in the direction of the arrow B into the opening 58 formed in the caliper 14 and into the groove 60 in the sleeve 48. Torsion is then exerted according to the arrow D on the U-shaped portion 66 of the spring 54. When the branch 74 of the U-shaped portion 66 is capable of passing beneath the surface 70 formed in the caliper, the spring 54 is caused to pivot in the direction of the arrow E until the branch 72 comes to bear on the surface 76 of the caliper 14. On releasing the torsion, the spring 54 puts itself in position according to the arrow A, the central portion 68 comes to bear on the surface 70 of the caliper 14 and the branch 74 comes opposite the surface 78 of the caliper, which prevents the U-shaped portion 66 from coming adrift from the caliper. The spring 54 is therefore thus locked on the caliper 14.

As can be seen more particularly in FIG. 3, the rectilinear portion 56 of the spring 54 is supported on the one hand in the opening 58 and on the other hand by its central portion on the bush 48, and this maintains the bush 48 in contact with the arm 22 of the caliper 14 in the direction of the arrow F, which allows compensation of the clearances and manufacturing tolerances capable of existing between the bush 48 and the bore 40, the spring 54 thus performing the function of anti-noise spring for the sleeve.

Dismounting of the brake is effected in the reverse order of the operations which have just been described.

It is evident therefore, on reading the above, that the spring 54 locks the sleeve 48 and is fixed positively relative to the caliper 14 by means of the U-shaped portion 66, and different ways of dismounting cannot damage the spring and its locking on account of the helical portion 62 of which the elasticity is sufficient to cope with all the maneuvres necessary for mounting and dismounting this spring 54. It is likewise evident that this spring performs the function of anti-noise spring for the sleeve 48.

I claim:

1. A locking element for a caliper of a disc brake mounted in sliding relationship on a fixed support comprising two friction elements received in anchorage and in sliding motion in said fixed support and capable of becoming frictionally engaged with the opposed faces of a rotating disc during operation of a brake motor acting directly on one of the friction elements and acting on the other friction element by reaction across the sliding caliper, at least one axial post locked to the fixed support and receiving in sliding motion a corresponding bore formed in the caliper, said post cooperating with the corresponding bore by means of a bush fixed axially in said bore by means of said locking element, said locking element defining a rectilinear portion passing through a groove provided in said bush and in a wall of said bore, characterized in that said locking element is fixed positively relative to said caliper by means of a U-shaped portion of said locking element remote from said bush and cooperating with a portion of the caliper, said locking element including a helical portion between said U-shaped portion and said rectilinear portion, said helical portion forming a resilient winding disposed radially outwardly of said bush and opposing said caliper, said helical portion being connected with said U-shaped portion so that said helical portion limits the position of said rectilinear portion within said groove and said helical portion also bias said U-shaped portion away from said rectilinear portion into engagement with said caliper portion, the rectilinear portion extending directly from the helical portion and comprising only a single straight portion extending through said groove.

* * * * *